United States Patent
Kim

(10) Patent No.: US 9,608,701 B2
(45) Date of Patent: Mar. 28, 2017

(54) METHOD AND APPARATUS FOR TRANSMITTING/RECEIVING SIGNAL IN DISTRIBUTED-ARRAY MASSIVE MIMO SYSTEM

(71) Applicant: Electronics and Telecommunications Research Institute, Daejeon (KR)

(72) Inventor: Seong Rag Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/952,602

(22) Filed: Nov. 25, 2015

(65) Prior Publication Data

US 2016/0191124 A1 Jun. 30, 2016

(30) Foreign Application Priority Data

Nov. 25, 2014 (KR) .................. 10-2014-0165654
Nov. 25, 2015 (KR) .................. 10-2015-0165736

(51) Int. Cl.
*H04B 7/02* (2006.01)
*H04B 7/0413* (2017.01)
*H04B 7/06* (2006.01)

(52) U.S. Cl.
CPC ......... *H04B 7/0413* (2013.01); *H04B 7/0617* (2013.01)

(58) Field of Classification Search
CPC .. H04B 7/0626; H04B 7/0617; H04B 7/0619; H04B 7/0408; H04B 7/0634; H04B 7/0608; H04B 7/0413; H04B 7/0632; H04L 27/2626; H04L 27/2647; H04L 27/0008; H04L 5/0048
See application file for complete search history.

(56) References Cited

U.S. PATENT DOCUMENTS

| | | | |
|---|---|---|---|
| 8,977,309 B2* | 3/2015 | Schmidt | 343/893 |
| 2008/0081570 A1 | 4/2008 | Jeong et al. | |
| 2009/0067513 A1* | 3/2009 | Kim | H04B 7/0413 375/260 |
| 2015/0016379 A1* | 1/2015 | Nam | H04B 7/0456 370/329 |
| 2015/0092621 A1 | 4/2015 | Jalloul et al. | |

(Continued)

FOREIGN PATENT DOCUMENTS

| | | |
|---|---|---|
| KR | 1007995800000 B1 | 1/2008 |
| KR | 1020130097117 A | 9/2013 |

OTHER PUBLICATIONS

Gregory G. Raleigh et al., "A Blind Adaptive Transmit Antenna Algorithm for Wireless Communication", ICC '95, 1995, pp. 1494-1499.

*Primary Examiner* — Khanh C Tran
(74) *Attorney, Agent, or Firm* — William Park & Associates Ltd.

(57) ABSTRACT

An apparatus for transmitting and receiving signal and a method thereof are provided. The apparatus for transmitting signals selects at least one array of a plurality of arrays connected to the apparatus based on a spatial covariance matrix of an uplink from a terminal to the plurality of arrays, wherein the spatial covariance matrix ensures channel reciprocity at downlink from the plurality of arrays with the terminal, and forms a transmission beam to be transmitted to the terminal through the at least one selected array.

17 Claims, 15 Drawing Sheets

(56) References Cited

U.S. PATENT DOCUMENTS

| | | | | |
|---|---|---|---|---|
| 2015/0236765 A1* | 8/2015 | Yu | ......................... | H04B 7/0452 |
| | | | | 375/267 |
| 2015/0358055 A1* | 12/2015 | Molisch | ............... | H04B 7/0608 |
| | | | | 370/329 |
| 2016/0134323 A1* | 5/2016 | Bengtsson | ............... | H01Q 3/30 |
| | | | | 455/562.1 |

* cited by examiner

METHOD AND APPARATUS FOR TRANSMITTING/RECEIVING SIGNAL IN DISTRIBUTED-ARRAY MASSIVE MIMO SYSTEM

CROSS-REFERENCE TO RELATED APPLICATION

This application claims priority to and the benefit of Korean Patent Application Nos. 10-2014-0165654 and 10-2015-0165736 filed in the Korean Intellectual Property Office on Nov. 25, 2014 and Nov. 25, 2015, respectively, the entire contents of which are incorporated herein by reference.

BACKGROUND OF THE INVENTION (a) Field of the Invention

The present disclosure relates to a method and apparatus for transmitting/receiving signal using a distributed-array MIMO system.

(b) Description of the Related Art

With the advent of a new high-quality multimedia service, wireless data traffic has explosively increased each year. The wireless data traffic has increased two-fold each year, and it is expected to increase 1000-fold by 2020 compared to 2010. Research on a new generation (5G) mobile communication system is in progress globally in order to efficiently deal with the increasing wireless data traffic.

In one of the ways to handle increasing wireless data traffic, there is a method of taking advantage of the wide frequency band. Because the cellular band called the sweet zone is already saturated, the higher frequency band may have to be used to secure a wide frequency band. For example, the millimeter wave band may be used in the mobile communication network. However, the more the frequency of the signal scattering component is smaller, the more the line of sight (LOS) component is relatively larger, and the transmission loss caused by obstacles such as buildings (that is, penetration loss) is extremely more severe. Therefore, in the high frequency band including the millimeter wave band, if the channel where the LOS is good is not secured, a coverage hole occurs, and it is difficult to provide normal service. In particular, in the urban environment, the normal mobile communication service is difficult to provide through a high frequency band. For use of the high frequency band in the urban environment, it should be able to increase the diversity gain by securing a LoS channel or a LoS-dominant channel as much as possible.

SUMMARY OF THE INVENTION

An exemplary embodiment provides an apparatus for transmitting signals using distributed arrays.

Another exemplary embodiment provides a method for transmitting signals using distributed arrays.

Another exemplary embodiment provides an apparatus for receiving signals using distributed arrays.

Another embodiment provides an apparatus for transmitting signals, including: at least one processor; a memory; and a radio frequency unit, by executing at least one program stored in the memory, wherein the at least one processor selects at least one array of a plurality of arrays connected to the apparatus based on a spatial covariance matrix of an uplink from a terminal to the plurality of arrays, wherein the spatial covariance matrix ensures channel reciprocity at downlink from the plurality of arrays to the terminal, and forms a transmission beam to be transmitted to the terminal through the at least one selected array, and wherein the plurality of arrays include at least one base station (BS) antenna, respectively.

The at least one processor may estimate the spatial covariance matrix based on a pilot signal to be transmitted to the terminal, determine a selection index to select the at least one array based on the estimated spatial covariance matrix, and select the at least one array based on the selection index when selecting the at least one array.

The at least one processor may perform eigen-decomposition on the spatial covariance matrix, and determine the selection index to compare a result of the eigen-decomposition with a quality threshold value of a channel at the downlink when determining the selection index.

The at least one processor may form the transmission beam based on a Blind Beam-Forming (BBF) scheme when forming the transmission beam.

The at least one processor may perform eigen-decomposition on the spatial covariance matrix, calculate a weight vector based on a result of the eigen-decomposition, and form the transmission beam using the weight vector based on the BBF scheme when forming the transmission beam based on the BBF scheme.

The at least one processor may calculate the weight vector based on a maximum eigenvector and a maximum eigenvalue of the spatial covariance matrix, which is the result of the eigen-decomposition when calculating the weight vector.

The at least one processor may form the transmission beam in consideration of a transmission power coefficient and interference with other terminals when forming the transmission beam using the weight vector based on the BBF scheme.

The at least one processor may further convert the transmission beam into a radio frequency (RF) analog signal, and deliver the RF analog signal to the at least one selected array through a link when forming the transmission beam using the weight vector based on the BBF scheme.

Another embodiment provides a method for transmitting signals, including: selecting at least one array of a plurality of arrays connected to the signal transmitting apparatus based on a spatial covariance matrix of an uplink from a terminal and the plurality of arrays, wherein the spatial covariance matrix ensures channel reciprocity at downlink from the plurality of arrays to the terminal; and forming a transmission beam to be transmitted to the terminal through the at least one selected array, wherein the plurality of arrays include at least one base station (BS) antenna, respectively.

The selecting may include: estimating the spatial covariance matrix based on a pilot signal to be transmitted to the terminal; determining a selection index to select the at least one array based on the estimated spatial covariance matrix; and selecting the at least one array based on the selection index.

The determining the selection index may include: performing eigen-decomposition on the spatial covariance matrix; and determining the selection index to compare a result of the eigen-decomposition with a quality threshold value of a channel at the downlink.

The forming the transmission beam may include forming the transmission beam based on a Blind Beam-Forming (BBF) scheme.

The forming the transmission beam based on the BBF scheme may include: performing eigen-decomposition on the spatial covariance matrix; calculating a weight vector based on a result of the eigen-decomposition; and forming the transmission beam using the weight vector based on the BBF scheme.

The calculating the weight vector may include calculating the weight vector based on a maximum eigenvector and a maximum eigenvalue of the spatial covariance matrix, which is the result of the eigen-decomposition.

The forming the transmission beam using the weight vector based on the BBF scheme may include forming the transmission beam in consideration of a transmission power coefficient and interference with other terminals.

The method may further include: converting the transmission beam into radio frequency (RF) analog signal; and delivering the RF analog signal to the at least one selected array through a link.

Another embodiment provides an apparatus for receiving signals, including: at least one processor; a memory; and a radio frequency unit, by executing at least one program stored in the memory, wherein the at least one processor selects at least one array of a plurality of arrays connected to the apparatus based on an estimated channel vector on a channel of an uplink from a terminal to the plurality of arrays, and forms a reception beam based on a received data signal through the at least one selected array, wherein the plurality of arrays include at least one base station (BS) antenna, respectively.

The at least one processor may determine a selection index by comparing the estimated channel vector with a quality threshold value on the channel of the uplink, and select the at least one array based on the selection index when selecting the at least one array.

The at least one processor may form the reception beam based on a maximal ratio combining (MRC) scheme when forming the reception beam.

The at least one processor may form the reception beam using a reception power coefficient and a beamforming weight vector based on the MRC scheme when forming the reception beam based on the MRC scheme.

DETAILED DESCRIPTION OF THE EMBODIMENTS

Figure 1:
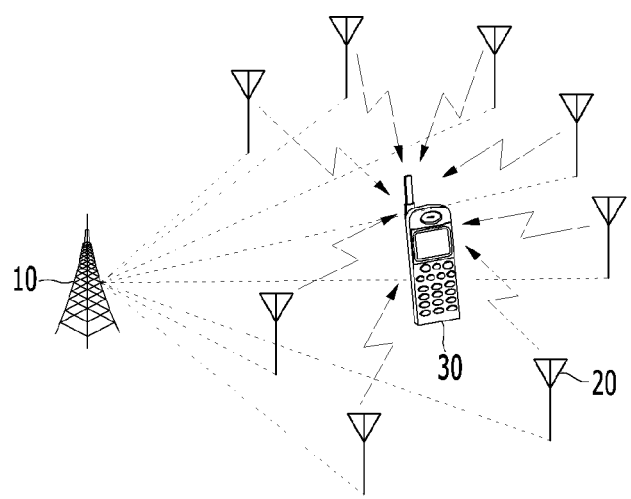
FIG. 1 is a schematic diagram of a distributed antenna system.

Hereinafter, exemplary embodiments will be described in detail with reference to the accompanying drawings so that those skilled in the art may easily practice the present invention. However, the present invention may be modified in various different ways, and is not limited to embodiments described herein. In the accompanying drawings, portions unrelated to the description will be omitted in order to obviously describe the present invention, and similar reference numerals will be used to describe similar portions throughout the present specification.

Throughout the specification, a terminal may be called a mobile station (MS), a mobile terminal (MT), an advanced mobile station (AMS), a high reliability mobile station (HR-MS), a subscriber station (SS), a portable subscriber station (PSS), an access terminal (AT), user equipment (UE), a machine-type communication (MTC) device, and the like, and may include all or some of the functions of the MS, the MT, the AMS, the HR-MS, the SS, the PSS, the AT, the UE, the MTC device, and the like Further, the base station (BS) may be called an advanced base station (ABS), a high reliability base station (HR-BS), a node B, an evolved node B (eNodeB), an access point (AP), a radio access station (RAS), a base transceiver station (BTS), a mobile multihop relay (MMR)-BS, a relay station (RS) serving as a base station, a relay node (RN) serving as a base station, an advanced relay station (RS) serving as a base station, a high reliability relay station (HR-RS) serving as a base station, small base stations (a femto base station (femto BS), a home node B (HNB), a home eNodeB (HeNB), a pico base station (pico BS), a macro base station (macro BS), a micro base station (micro BS), and the like), and the like, and may include all or some of the functions of the ABS, the HR-BS, the node B, the eNodeB, the AP, the RAS, the BTS, the MMR-BS, the RS, the RN, the ARS, the HR-RS, the small base stations, and the like.

FIG. 1 is a schematic diagram of a distributed antenna system.

Referring to FIG. 1, a distributed antenna system (DAS) where a plurality of antennas connected to a base station (BS) 10 are deployed at several points geographically is illustrated. In the DAS, each terminal 30 may communicate with the BS 10 through an antenna 20 located nearest thereto. That is, because of the reduced distances between the antenna 20 and the terminal 30, the transmission efficiency may be increased. Alternatively, because the terminal 30 can communicate with antennas 20 located in several directions, the terminal 30 may continue the communication through another antenna 20 when a path to the antenna 20 is blocked. In this case, the shaded area or the coverage hole may be efficiently reduced. In the DAS, each antenna 20 is connected to the BS 10 through the wired link. As the number of antennas 20 connected to the BS 10 is increased, the high cost for building the DAS is required. Therefore, the DAS is usually used in a small area, as it is difficult to build the DAS in a large area.

In another way to handle increasing wireless data traffic, there is a method that takes advantage of small cell technology. The small cell technology can lineally increase the whole system capacity to the number of base stations by increasing the number of base stations per unit area. In small cell technology, the frequency of handover may be increased as the radius of the cell is reduced, the mobility management of the terminal may be complicated, and inference between cells may be increased. The cost for the setup and maintenance may also be increased as the number of the BS 10 is increased.

Meanwhile, the remote radio head (RRH) technology has been studied to implement the advantage of the small cell and to reduce the cost.

Figure 2:
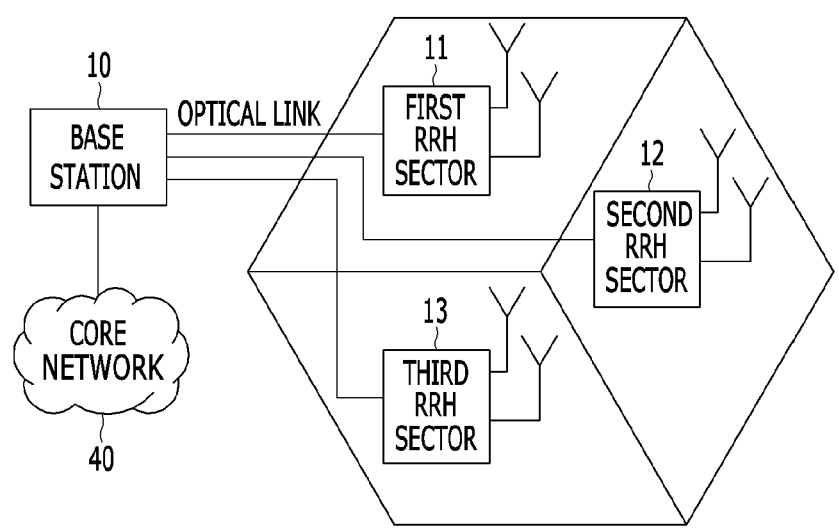
FIG. 2 is a schematic diagram of a network including RRH.

FIG. 2 is a schematic diagram of a network including RRH sectors.

In the network including RRH sectors 11 to 13, the BS 10 connected to a core network 40 maintains the connection to the plurality of RRH sectors 11 to 13 through the optical link. In this case, most digital units (DU) are deployed in the BS 10. In a service area where the antenna 20 is installed, an analog unit (AU) and some DUs may be deployed as the RRH sectors 11 to 13, so that the cost may be reduced. A digital optical cable may connect the DU and the AU. However, since the RRH sectors also have a structure of a small cell, the frequency of the handover may be increased and it is difficult to manage the mobility of the terminal.

Using a high frequency band can easily expand the spectrum. Since the reception power is inversely proportional to the square of the frequency (P∝1/f2), the beamforming technology may have to be used in order to maintain equal reception power at a high frequency. For example, in order to maintain the same power with a 4 we2-dimensional array antenna in a 3 GHz band, a 40 z b 2-dimensional array antenna may be required. In this case, the number of antennas per array is increased 100-fold, and the antenna aperture area occupied by the array is the same and the reception power also is the same.

The massive MIMO (Multi-Input Multi-Output) technology is a beamforming technique when the number of antennas is myriad. Since many antennas are required to maintain quality of a mobile communication service in a high frequency band including the millimeter wave band, the structure of the BS may naturally be converged to the massive MIMO system.

The massive MIMO system including myriad antennas has the following advantages.

The array gain may be infinite because it is proportional to the number of BS antennas.

The interference between users may be completely removed.

The spatial multiplexing gain may be infinite because all the terminals are able to communicate without interfering with each other.

Since a simple Single-Input Single-Output (SISO) receiver is required for all terminals, a low power consumption terminal may be implemented.

In the massive MIMO system, the BS performs beamforming for a transmitting signal and transmits the beamformed signal to each terminal. In a time division duplex (TDD) system, since channel reciprocity is ensured, the BS can be aware of an instantaneous channel of the downlink using the uplink. However, since the different frequency band is used for the uplink and the downlink in the frequency division duplex (FDD) system, each of instantaneous channels of the uplink and the downlink are also different from each other. That is, unlike the TDD system, the channel reciprocity is not ensured in the FDD system. In the FDD system, a feedback method in which the terminal reports channel information to the BS may be used to secure the instantaneous channel information of the downlink. In this case, it is difficult to provide a high-speed mobile communication service because of the time delay for the feedback procedure of the channel information. Therefore, the beamforming may have to be performed without the feedback from the terminal for the high-speed mobile communication service.

Figure 3:
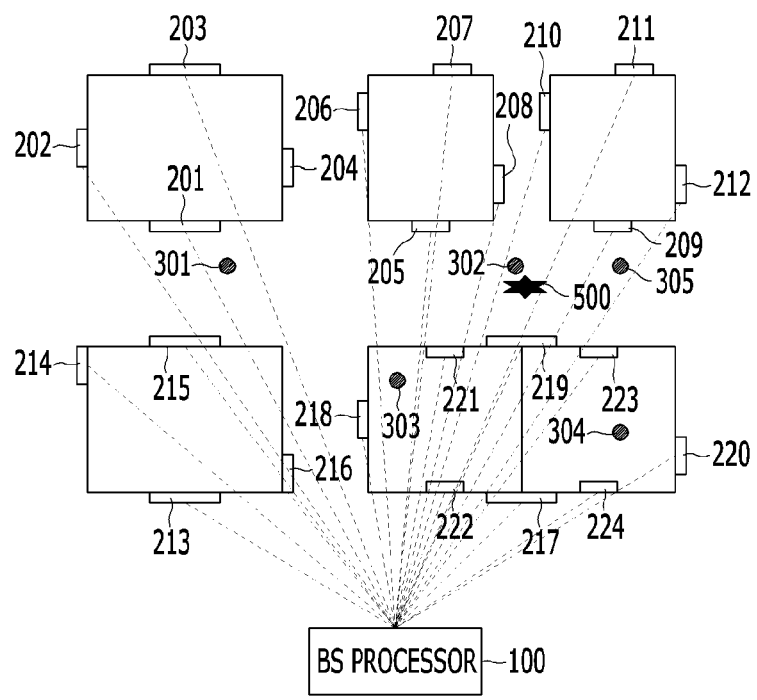
FIG. 3 is a schematic diagram illustrating a distributed array massive MIMO system according to an exemplary embodiment.

FIG. 3 is a schematic diagram illustrating a distributed array massive MIMO system according to an exemplary embodiment.

Referring to FIG. 3, a plurality of arrays 201 to 224 distributed in a distributed-array massive MIMO system (DAMMS) are connected to a BS processor 100. The 1st array 201 to the 20th array 220 are deployed outside, and the 21st array 221 to the 24th array 224 are deployed inside. The plurality of arrays 201 to 224 include at least one BS antenna, respectively.

Since the DAMMS according to the exemplary embodiment can ensure proximity between terminals 301 to 305 and the plurality of arrays, spectrum efficiency may be enhanced. Referring to FIG. 3, a first terminal 301 may communicate with the 1st array 201, the 5th array 205, the 9th array 209, the 15th array 215, the 18th array 218, and the 19th array 219 through a LOS channel, and may communicate with the remainder of the plurality of arrays through a non-LOS channel.

In FIG. 3, the centralized massive MIMO system where all the antennas in the system are centralized at the location of the 19th array may be hypothesized. Since the first terminal 301 communicates with the 1st array 201 and the 15th array 215 that are nearer than the 19th array 219 in the DAMMS, the first terminal may secure relatively higher spectrum efficiency than in a centralized massive MIMO system. The DAMMS may also increase the diversity gain, as compared to a centralized massive MIMO.

Meanwhile, even though a second terminal 302 is at a position closest to the $19^{th}$ array 219, the LOS channel is blocked because of the obstacle located between the second terminal 302 and the $19^{th}$ array 219. In this case, if the structure of the BS is the centralized massive MIMO structure and the BS only communicates with the $19^{th}$ array 219, the quality of the communication deteriorates rapidly. However, in the DAMMS, the second terminal may secure the LOS channel through the other arrays (for example, the $1^{st}$ array, the $5^{th}$ array, the $8^{th}$ array, the $9^{th}$ array, the $10^{th}$ array, or the $15^{th}$ array, etc.) than the $19^{th}$ array. In addition, in the DAMMS, the terminal may obtain enough diversity gain in the millimeter wave circumstance which is sensitive the LOS, so that the service for the terminal may be provided without deterioration of the communication quality.

In the FIG. 3, the first terminal 301 and the second terminal 302 may communicate with BS respectively through different antenna array groups. According to an exemplary embodiment, when an array group that communicates with a terminal is defined as a virtual cell, the DAMMS may form a UE-centric virtual cell.

Referring to FIG. 3, a third terminal 303 and a fourth terminal 304 are located inside separate rooms divided by a partition, respectively. Since the penetration loss of the partition is usually lower than the penetration loss of the outer wall, it is hypothesized that considerable waves can penetrate through the partition. Therefore, the third terminal 303 may communicate with the $221^{st}$ array and the $222^{nd}$ array through the LOS channel, and may communicate with the $223^{rd}$ array and the $224^{th}$ array through the NLOS channel by penetrating the partition. That is, in the DAMMS, since the BS can communicate with the inside terminals as well as the outside terminals, the coverage hole that may occur inside and outside when the high frequency band is used can be efficiently reduced.

Meanwhile, since the DAS requires a wired link between the BS and each antenna, the cost is linearly increased according to the increase of the number of antennas. However, in the DAMMS, since the number of arrays is smaller than the number of antennas, the cost for the setup and maintenance of the wired link may be reduced.

Figure 4:
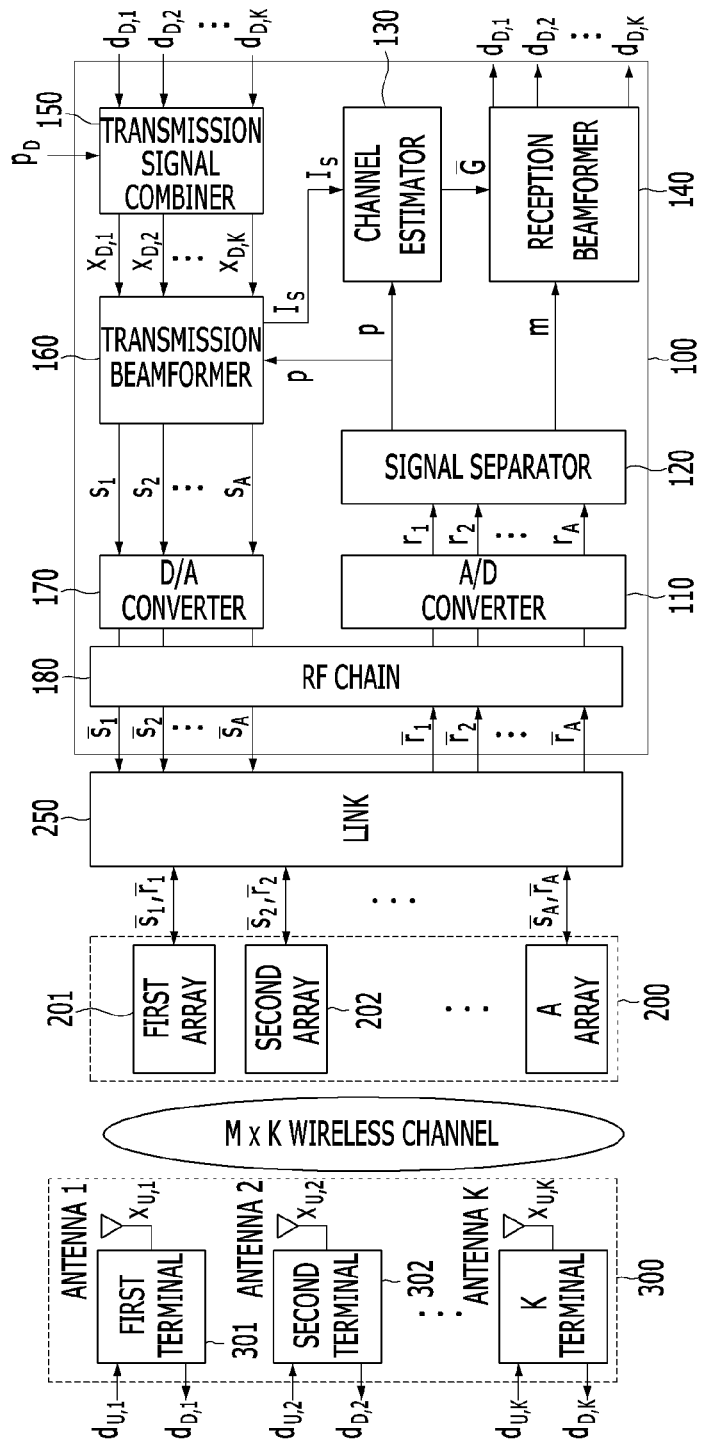
FIG. 4 is a schematic structural diagram illustrating a base station and a terminal of a DAMMS according to an exemplary embodiment.

FIG. 4 is a schematic structural diagram illustrating a base station and a terminal of a DAMMS according to an exemplary embodiment.

Referring to FIG. 4, the BS of the DAMMS in the FDD system includes a BS processor 100, distributed arrays 200, and a link 250 that connects the BS processor 100 and the distributed arrays 200. The total number of BS antennas included in the distributed arrays 200 is M. The maximum number of terminals to which the BS can simultaneously provide service is K, and the number of terminals that currently receive the service is $K_S$ ($K_S \leq K$).

The BS processor 100 according to an exemplary embodiment includes an A/D converter 110, a signal separator 120, a channel estimator 130, a reception beamformer 140, a transmission signal combiner 150, a transmission beamformer 160, a D/A converter 170, and an RF chain 180. The function of each component included in the BS processor 100 is specifically described in the following.

Figure 5:
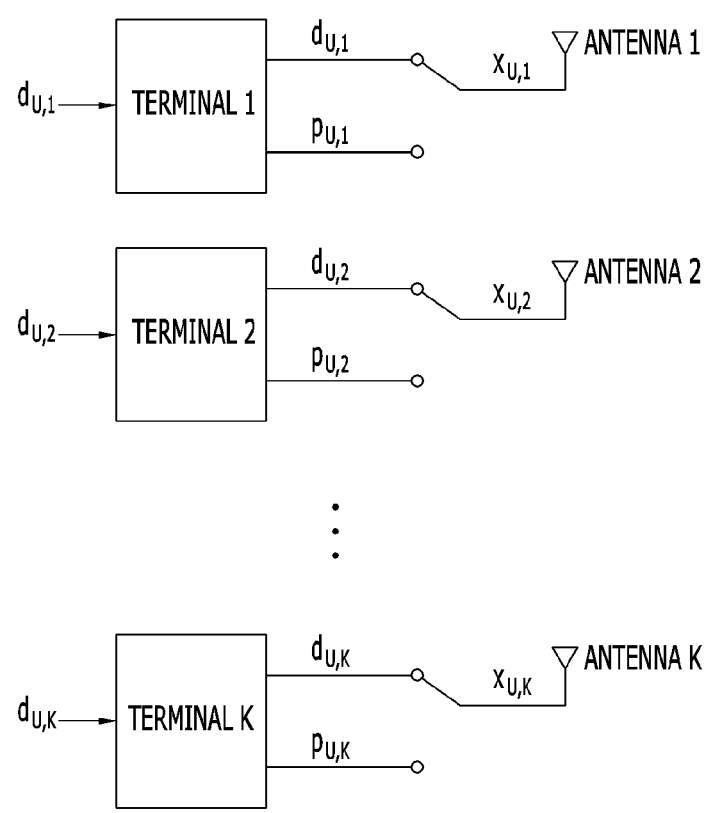
FIG. 5 is a schematic structural diagram illustrating a transmission terminal of the DAMMS according to an exemplary embodiment.
Figure 6:
FIG. 6 is a schematic structural diagram illustrating a frame format of a transmission signal transmitted by terminals according to an exemplary embodiment.

FIG. 5 is a schematic structural diagram illustrating a transmission terminal of the DAMMS according to an exemplary embodiment, and FIG. 6 is a schematic structural diagram illustrating a frame format of a transmission signal transmitted by terminals according to an exemplary embodiment.

In an exemplary embodiment, the transmission terminal transmits a terminal-transmitted signal to the BS through an uplink. Referring to FIG. 5, a terminal-transmitted signal ($x_{U,k}$) of terminal k includes a data signal ($d_{U,k}$) and a pilot signal ($p_{U,k}$).

The frame length of the terminal-transmitted signal in FIG. 6 is symbol $L_F$, and includes pilot symbols $L_U$ and data symbols $L_F$-$L_U$. That is, the sequences of the uplink pilot signal may include the symbol $L_U$. In this case, a maximum of $L_U$ pilot signals which are orthogonal to each other may exist in a cell. Accordingly, the number of terminals that the BS can simultaneously provide service for is $L_U$. In this case, the sequence of k-th uplink pilot signal may be represented by the following Equation 1.

$$p_{U,k}(l), l=1, \ldots L_U \quad \text{(Equation 1)}$$

In the above Equation 1, k may be an identification of a pilot signal. As the sequences of pilot signals which are different from each other are orthogonal, a relationship between the two pilot signals can be expressed by the following Equation 2.

$$\sum_{l=1}^{L_U} p_{U,i}(l) p_{U,j}(l), i \neq j \quad \text{(Equation 2)}$$

Meanwhile, a transmission signal vector of a terminal-transmitted signal transmitted from K terminals in a symbol duration n may be represented by the following Equation 3.

$$x_U(n) = \begin{bmatrix} x_{U,1}(n) \\ x_{U,2}(n) \\ \vdots \\ x_{U,K}(n) \end{bmatrix} \quad \text{(Equation 3)}$$

Further, a data signal vector of a symbol n of a data transmission duration where the data signal is transmitted may be represented by the following Equation 4.

$$d_U(n) = \begin{bmatrix} d_{U,1}(n) \\ d_{U,2}(n) \\ \vdots \\ d_{U,K}(n) \end{bmatrix} \quad \text{(Equation 4)}$$

In the above Equation 4, $d_{U,k}$ is a transmission data signal of a terminal k. K terminals may transmit the data signal and the pilot signal using the same wireless resources to M BS antennas. In this case, M BS antennas are included in an A array 200, and the number of BS antennas included in an a-th array of the A array 200 is $M_a$. That is, the number of BS antennas included in each array 200 may be different from each other. The total number M of BS antennas included in the A array 200 may be represented by the following Equation 5.

$$M = \sum_{a=1}^{A} M_a \quad \text{(Equation 5)}$$

Meanwhile, the M×K uplink wireless channel between K terminals and M BS antennas may be represented by the following Equation 6.

$$G = \begin{bmatrix} g_{1,1} & g_{1,2} & \cdots & g_{1,K} \\ g_{2,1} & g_{2,2} & \cdots & g_{2,K} \\ \vdots & \vdots & \ddots & \vdots \\ g_{A,1} & g_{A,2} & \cdots & g_{A,K} \end{bmatrix} \quad \text{(Equation 6)}$$

In the above Equation 6, $g_{a,k}$ is an uplink channel between array a and terminal k. The wireless channel matrix G for a terminal may be represented by the following Equation 7.

$$G = [g_1 g_2 \cdots g_K] \quad \text{(Equation 7)}$$

In the above Equation 7, $g_k$ is an M×1 channel between terminal k and a BS antenna, and may be represented by the following Equation 8.

$$g_k = \begin{bmatrix} g_{1,k} \\ g_{2,k} \\ \vdots \\ g_{A,k} \end{bmatrix} \quad \text{(Equation 8)}$$

Referring to FIG. 4, the array 200 may output a received signal $\bar{r}_a$(analog) which is represented by the summation of received signals from K terminals. The bar of $\bar{r}_a$ indicates that the signal is an analog signal. The total uplink signal outputted from the array 200 may be represented by the following Equation 9.

$$\bar{r} = \begin{bmatrix} \bar{r}_1 \\ \bar{r}_2 \\ \vdots \\ \bar{r}_A \end{bmatrix} \quad \text{(Equation 9)}$$

Thereafter, the uplink signal received by the array 200 is delivered to the A/D converter 110 through the link 250. In this case, if the link 250 is implemented by wired link technology, such as radio over fiber (RoF), the link 250 may transmit an optical signal of an RF analog signal through an RF optical cable by converting the RF analog signal inputted from the array 200 into the optical signal, and deliver the RF analog signal to the RF chain 180 by converting the transmitted optical signal into the RF analog signal. That is, the link according to an exemplary embodiment may deliver the RF analog signal transmitted by the array 200 to the BS processor 100. The array 200 according to the exemplary embodiment may not include a component to convert an RF analog signal to a digital signal. According to another exemplary embodiment, the link 250 may be implemented by wireless link technology.

Then, the RF chain 180 converts the RF analog signal delivered from the link 250 into a baseband (BB) analog signal, and delivers the converted BB analog signal to the A/D converter 110.

The A/D converter 110 converts the inputted BB analog signal $\bar{r}_a$ into a digital signal $r_a$. In this case, the digital signal $r_a$ outputted from the A/D converter 110 may be represented by the following Equation 10.

$$r = \begin{bmatrix} r_1 \\ r_2 \\ \vdots \\ r_A \end{bmatrix} \quad \text{(Equation 10)}$$

In the above Equation 10, $r_a$ is a digital signal received by the array a. The digital signal r may include a pilot signal and a data signal, and the two signals may be located in independent transmission regions, respectively. Afterwards, the signal separator 120 may separate a pilot signal matrix P and a data signal vector m from the digital signal r. The pilot signal matrix (M×K matrix) may be represented by the following Equation 11.

$$P = \begin{bmatrix} p_{1,1} & p_{1,2} & \cdots & p_{1,K} \\ p_{2,1} & g_{2,2} & \cdots & p_{2,K} \\ \vdots & \vdots & \ddots & \vdots \\ p_{A,1} & p_{A,2} & \cdots & p_{A,K} \end{bmatrix} \quad \text{(Equation 11)}$$

In the above Equation 11, $p_{a,k}$ is an $M_a \times 1$ pilot signal vector of terminal k received through an array a. Further, the pilot signal matrix may be represented by the following Equation 12.

$$P = [p_1 p_2 \ldots p_K] \quad \text{(Equation 12)}$$

In the above Equation 12, $p_k$ is an M×1 pilot signal vector between terminal k and the BS antenna. The pilot signal vector between terminal k and BS antenna may be represented by the following Equation 13.

$$p_k = \begin{bmatrix} p_{1,k} \\ p_{2,k} \\ \vdots \\ p_{A,k} \end{bmatrix} \quad \text{(Equation 13)}$$

Subsequently, the channel estimator 130 generates an estimated channel matrix $\hat{G}$ by estimating an M×K wireless channel G based on the pilot signal matrix P.

Further, the pilot signal of terminal k received by an array a in a pilot symbol duration may be represented by the following Equation 14.

$$p_{a,k}(n) = g_{a,k}(n) p_{U,k}(n) + n_{a,k}(n) \quad \text{(Equation 14)}$$

In the above Equation 14, $n_{a,k}(n)$ represents an $M_a \times 1$ noise matrix between terminal k and array a, and, the channel estimation in frame f ($n = fL_F + L_U$) may be performed as the following Equation 15.

$$\hat{g}_{a,k}(n) = \frac{1}{L_U |p_{U,k}|^2} \sum_{l=1}^{L_U} p_{a,k}(l + fL_F) \times p_{U,k}^*(l + fL_F) \quad \text{(Equation 15)}$$

The reception beamformer 140 then restores data signal received from each terminal based on the estimation channel matrix $\hat{G}$ and data reception signal m.

Figure 7:
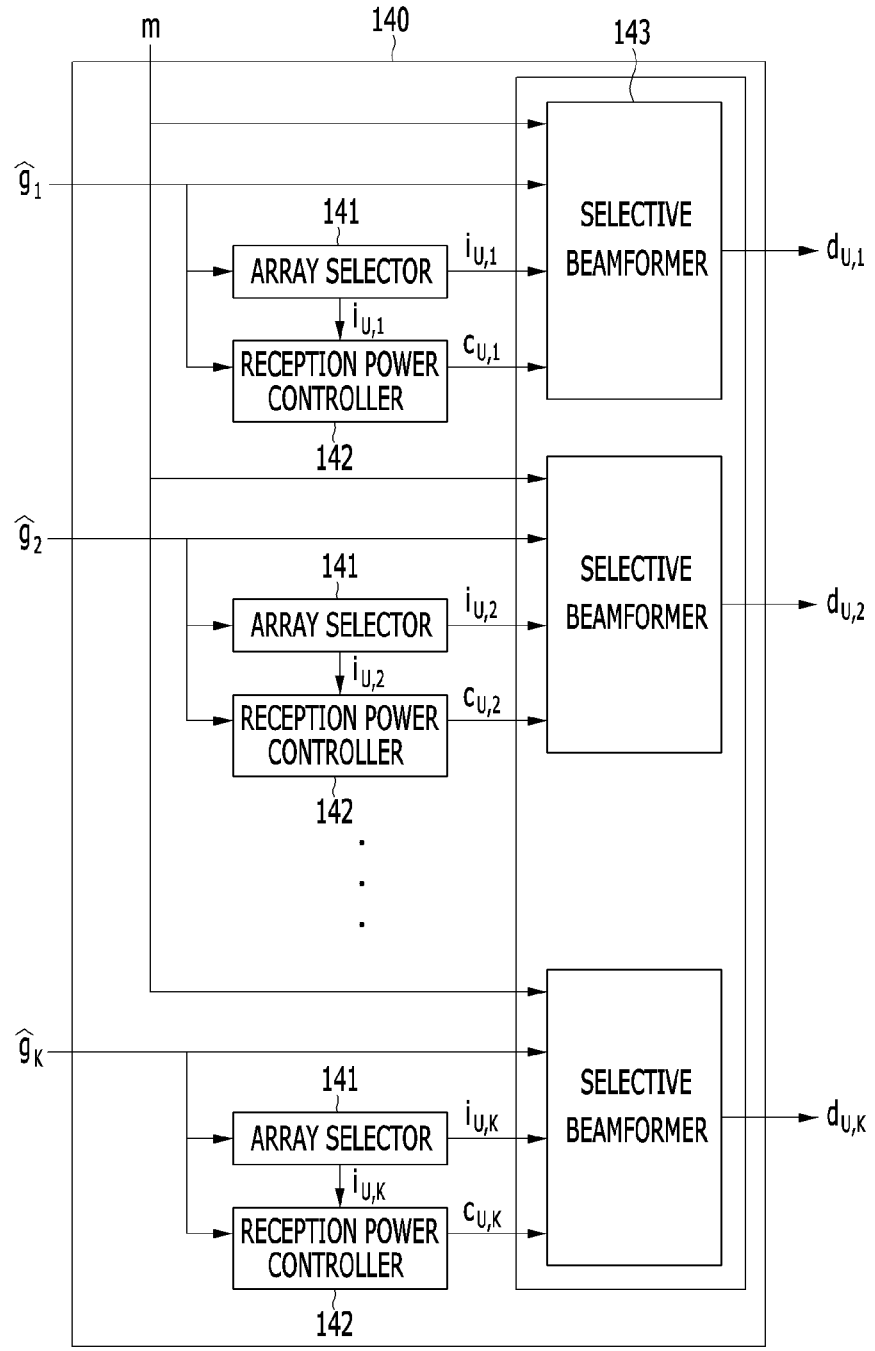
FIG. 7 is a schematic structural diagram illustrating a reception beamformer of a base station of the DAMMS according to an exemplary embodiment.
Figure 8:
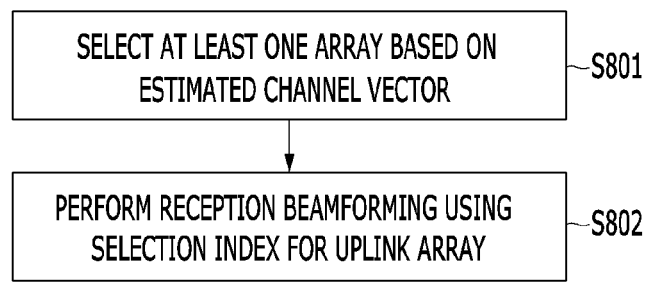
FIG. 8 is a flowchart illustrating a method for receiving a signal of a BS processor according to an exemplary embodiment.

FIG. 7 is a schematic structural diagram illustrating a reception beamformer of a base station of the DAMMS according to an exemplary embodiment, and FIG. 8 is a flowchart illustrating a method for receiving a signal of a BS processor according to an exemplary embodiment.

Referring to FIG. 7 and FIG. 8, the reception beamformer 140 of the BS processor 100 according to an exemplary embodiment independently performs reception beamforming for each terminal. The reception beamformer 140 includes at least one array selector 141, at least one reception power controller 142, and at least one selective beamformer 143.

First of all, the array selector 141 select at least one array of a plurality of arrays 200 connected to the BS processor 100 based on the estimated channel vector $\hat{g}_{a,k}$ (S801). A selection index between an array a and a terminal k may be represented by the following Equation 16.

$$i_{U,a,k} = \begin{cases} 1, & \|\hat{g}_{a,k}\|^2 > M_a T_U \\ 0, & \|\hat{g}_{a,k}\|^2 \leq M_a T_U \end{cases} \quad \text{(Equation 16)}$$

In the above Equation 16, $T_U$ indicates a quality threshold value of uplink channel. That is, the selection index of terminal k for the array a may be determined based on magnitude comparison between the quality threshold value of the uplink channel from the array a to the terminal k and the estimated channel vector. And, a selection index vector of the terminal k for the array of uplink may be represented by the following Equation 17.

$$i_{U,k} = [i_{U,1,k} i_{U,1,k} \cdots i_{U,A,k}]^T \quad \text{(Equation 17)}$$

Meanwhile, at least one reception beamforming algorithm is applicable for the selective beamformer 143 according to an exemplary embodiment, such as maximal ratio combining (MRC), minimum mean squared error (MMSE), and zero forcing (ZF). As the matrix inversion is required for the MMSE and ZF, the complexity may be exponentially increased depending on the increasing of the number of antennas (M). The MRC which is one of the optimal beamforming schemes that maximizes the instantaneous signal-to-noise ratio (SNR) does not require the matrix inversion, and the complexity of the MRC is relatively low. In the present disclosure, the reception beam can be formed by the MRC scheme as the reception beamforming scheme.

The selective beamformer 143 performs reception beamforming using the selection index for the array of the uplink (S802). In this case, the selective beamformer 143 performs reception beamforming using the MRC scheme. For example, if the uplink channel between the array a and the terminal k is good ($i_{U,a,k}=1$), the received signal from the array a is included in the MRC reception beamforming for the data signal, while if the uplink channel is poor ($i_{U,a,k}=0$), the received signal from the array a is not included in the MRC reception beamforming for the data signal. This is because the received signal from the array a does not contribute significantly to the restoration of transmitted data ($d_{U,k}$) from the terminal k if the channel ($g_{a,k}$) between the array a and the terminal k is poor. Meanwhile, the quality of NLOS channels is remarkably low because of the scattering and high penetration loss in the high frequency band. In particular, these symptoms may appear clearly in the millimeter wave band. This is because the array having poor channel quality contributes less to the MRC performance, and the quality of the estimated channel is also poor, so that the performance of the BS may become worse.

Referring to FIG. 3, when the quality threshold value ($T_U$) of the LOS and the NLOS are separately estimated, the terminal may secure a LOS channel with the $1^{st}$, $5^{th}$, $9^{th}$, $15^{th}$, $18^{th}$, and $19^{th}$ arrays, respectively. Therefore, when the selective MRC beamforming is used, only 6 arrays of the entire 24 arrays may contribute for the restoration of the transmitted data signal from the terminal. If we consider an array as an element cell, the 6 element cells of the $1^{st}$, $5^{th}$, $9^{th}$, $15^{th}$, $18^{th}$, and $19^{th}$ arrays may cooperate and form a virtual cell for the terminal. In an exemplary embodiment, the arrays that form the virtual cell may be different for each terminal, and the selective MRC beamforming may form a UE-centric virtual cell.

In an exemplary embodiment, the received data signal m inputted to the reception beamformer 140 may be represented by the following Equation 18.

$$m = G d_U + n_U \quad \text{(Equation 18)}$$

In the above Equation 18, $n_U$ represents M×1 uplink noise. The received data signal may be represented by an array as shown in the following Equation 19.

$$m = \begin{bmatrix} m_1 \\ m_2 \\ \vdots \\ m_A \end{bmatrix} \quad \text{(Equation 19)}$$

In the above Equation 19, $m_a$ represents a data signal received by the array a. Specifically, the data signal $m_a$ may be represented by the following Equation 20.

$$m_a = G_a d_U + n_{U,a} = \sum_{k=1}^{K} g_{a,k} d_{U,k} + n_{U,a} \quad \text{(Equation 20)}$$

In the above Equation 20, $n_{u,a}$ represents uplink noise received by the array a, and may be represented by the following Equation 21.

$$n_{U,a} = [n_{(U,a),1} n_{(U,a),2} \cdots n_{(U,a),M_a}]^T$$

$$\text{var}(n_{(U,a),m}) = \sigma_{U,a}^2 \text{ for } m=1, \ldots, M_a \quad \text{(Equation 21)}$$

Meanwhile, the MRC beamforming weight vector of the terminal k for the array a may be represented by the following Equation 22.

$$w_{U,a,k} = \hat{g}_{a,k}^H \quad \text{(Equation 22)}$$

Therefore, the output of the selective beamformer 143 for the terminal k may be represented by the following Equation 23.

$$\hat{d}_{U,k} = C_{U,k} \sum_{a=1}^{A} i_{a,k} w_{U,a,k} m_a = C_{U,k} \sum_{a=1}^{A} i_{a,k} \hat{g}_{a,k}^H m_a \quad \text{(Equation 23)}$$

In the above Equation 23, $C_{U,k}$ represents a reception power coefficient calculated by the reception power controller 142. The reception beamforming output $\hat{d}_{U,k}$ for the terminal k is an estimated value of the data signal transmitted by the terminal k, and an estimated data signal may be represented by the following Equation 24.

$$\hat{d}_{U,k} = C_{U,k} \Sigma_{a=1}^{A} i_{U,a,k} \hat{g}_{a,k}^H (\Sigma_{k=1}^{K} g_{a,k} d_{U,k} + n_{U,a})$$

$$= C_{U,k} \Sigma_{a=1}^{A} i_{U,a,k} (\|g_{a,k}\|^2 d_{U,k} + \Sigma_{j=1, j \neq k}^{K} \hat{g}_{a,k}^H g_{a,j} d_{U,k}) \quad \text{(Equation 24)}$$

In the above Equation 24, $n'_{U,a} = C_{U,k} \Sigma_{a=1}^{A} i_{U,a,k} \hat{g}_{a,k}^H n_{U,a}$.

When the channel estimation is performed ideally and the number of BS antennas is infinite, a spatial signature of each terminal will be asymptotically orthogonal. That is, the relationship between channel vectors may be represented by the following Equation 25.

$$\hat{g}_{a,k}^H g_{a,j} = 0, \text{ for } j \neq k \quad \text{(Equation 25)}$$

In this case, the estimated data signal of the terminal may be represented by the following Equation 26.

$$\hat{d}_{U,k} = C_{U,k} \sum_{a=1}^{A} i_{U,a,k} \|\hat{g}_{a,k}\|^2 d_{U,k} + n'_{U,a} \qquad \text{(Equation 26)}$$

The reception power coefficient is set to be $E[\hat{d}_{U,k}] = d_{U,k}$, therefore, the reception power coefficient may be represented by the following Equation 27.

$$C_{U,k} = \frac{1}{\sum_{a=1}^{A} i_{U,a,k} \|\hat{g}_{a,k}\|^2} \qquad \text{(Equation 27)}$$

Further, the estimated data signal may be represented by the following Equation 28.

$$\hat{d}_{U,k} = d_{U,k} + n'_{U,a} \qquad \text{(Equation 28)}$$

In this case, $$n'_{U,a} = \Sigma_{a=1}^{A} i_{U,a,k} \frac{\hat{g}_{a,k}^H}{\|\hat{g}_{a,k}\|^2} n_{U,a}.$$

Additionally, the variance of the estimated data signal may be represented by the following Equation 29.

$$\text{var}(\hat{d}_{U,k}) = \text{var}(n'_{U,a}) = \sum_{a=1}^{A} i_{U,a,k} \frac{\sigma_{U,a}^2}{\|\hat{g}_{a,k}\|^2} = \frac{\sigma_{U,a}^2}{C_{U,k}} \qquad \text{(Equation 29)}$$

That is, as the number of arrays that are selected is increased and the channel quality of the selected array is increased, the $C_{U,k}$ becomes larger and the estimation of the data signal is performed more accurately.

Finally, the estimated data signal for each terminal is demodulated and decoded.

Figure 9:
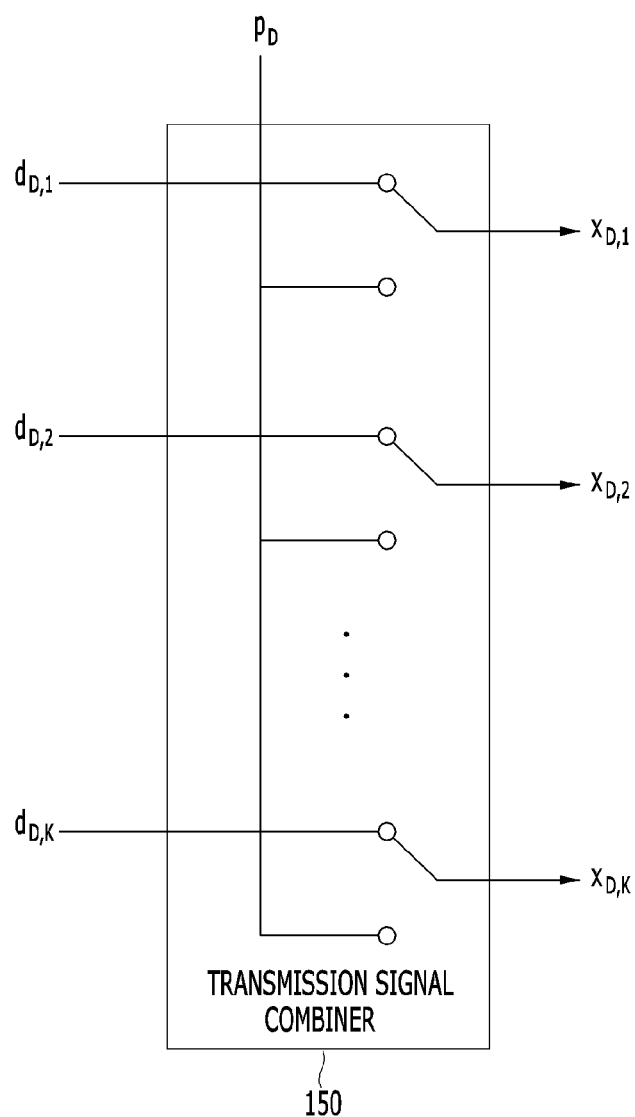
FIG. 9 is a schematic structural diagram illustrating a transmission signal combiner of a BS according to an exemplary embodiment.
Figure 10:
FIG. 10 is a schematic structural diagram illustrating a frame format of a transmission signal transmitted by a BS according to an exemplary embodiment.

FIG. 9 is a schematic structural diagram illustrating a transmission signal combiner of the BS according to an exemplary embodiment, and FIG. 10 is a schematic structural diagram illustrating a frame format of a transmission signal transmitted by the BS according to an exemplary embodiment.

Referring to FIG. 9, the transmission signal combiner 150 of the BS processor generates a transmission signal based on the data signal transmitted to the terminal and the common pilot signal. The transmission signal $x_{D,k}$ to be transmitted to a terminal k includes a data signal $d_{D,k}$ and a common pilot signal $p_D$. The transmission signal vector to be transmitted to K terminals in a symbol duration n may be represented by the following Equation 30.

$$x_D(n) = \begin{bmatrix} x_{D,1}(n) \\ x_{D,2}(n) \\ \vdots \\ x_{D,K}(n) \end{bmatrix} \qquad \text{(Equation 30)}$$

Referring to FIG. 10, the length of the frame according to the frame format of the DAMMS transmission signal of the FDD downlink is $L_F$ symbols. Further, the frame of the transmission signal includes $L_D$ pilot symbols and $L_F$-$L_D$ data symbols.

The data signal transmitted to each terminal is simultaneously transmitted to all terminals using the same transmission duration. The data signal vector transmitted to K terminals at symbol n of the data transmission duration may be represented by the following Equation 31.

$$d_D(n) = \begin{bmatrix} d_{D,1}(n) \\ d_{D,2}(n) \\ \vdots \\ d_{D,K}(n) \end{bmatrix} \qquad \text{(Equation 31)}$$

In the above Equation 31, $d_{D,k}(n)$ represents a data signal to be transmitted to the terminal k. The identical pilot signal may be simultaneously transmitted to all the terminals through the same transmission duration in a downlink. In symbol n included in the pilot transmission duration, K×1 downlink pilot signals to be transmitted to K terminals may be represented by the following Equation 32.

$$p_D(n) = \begin{bmatrix} p_{D,1}(n) \\ p_{D,2}(n) \\ \vdots \\ p_{D,K}(n) \end{bmatrix} = \begin{bmatrix} p_D(n) \\ p_D(n) \\ \vdots \\ p_D(n) \end{bmatrix} \qquad \text{(Equation 32)}$$

In the above Equation 32, $p_D$ represents a common pilot signal to be transmitted to all the terminals which have been serviced.

Meanwhile, a BS according to an exemplary embodiment performs transmission beamforming to transmit a transmission signal to each terminal. Since channel reciprocity is ensured in the TDD system, the BS in the TDD system can be aware of an instantaneous channel of the downlink using the uplink. In this case, maximal ratio transmission (MRT) may be generally used as the transmission beamforming algorithm for performing massive MIMO.

However, since the different frequency band is used for the uplink and the downlink in the FDD system, each of the instantaneous channels of the uplink and the downlink are also different from each other. That is, unlike the TDD system, the channel reciprocity is not ensured in the FDD system. In the FDD system, the BS may receive channel information included in the feedback information from the terminal to secure the instantaneous channel information of the downlink. In this case, it is difficult to provide a high-speed mobile communication service because the wireless resource for the feedback is required and time for feedback is delayed.

In the FDD system, reciprocity of a spatial covariance matrix may be secured by using the BS antennas instead of the reciprocity of the instantaneous channel. In the present disclosure, it is hypothesized that BS antennas can ensure the reciprocity of the spatial covariance matrix of up/down links. In addition, the Blind Beam-Forming (BBF) scheme, which uses the reciprocity of the spatial covariance matrix, is used for providing the high-speed mobile communication service in the FDD system as the transmission beamforming technique. The relationship among the Optimal Beam-Forming (OBF) scheme, the Eigen-Beamforming (EBF) scheme, and the BBF is as follows.

In an exemplary embodiment, the signal received by a terminal k may be represented by the following Equation 33.

$$y_k = h_k^T w x_{D,k} + n_{D,k} \qquad \text{(Equation 33)}$$

In the above Equation 33, $h_k$ represents an M×1 downlink channel vector between the terminal k and M BS antennas, w represents a transmission beamforming weight vector of a BS, $x_{D,k}$ represents a transmission signal to be transmitted to the terminal k, and $n_{D,k}$ represents additive white gaussian noise (AWGN) of the downlink. The instantaneous reception SNR of the terminal k may be represented by the following Equation 34.

$$\gamma_k = (h_k^T w)^H (h_k^T w) = w^H h_k^* h_k^T w = w^H \overline{R}_{D,k} w \quad \text{(Equation 34)}$$

In the above Equation 34, $\overline{R}_{D,k} = h_k^* h_k^T$.

The weight vector of the OBF maximizes the instantaneous SNR, as shown in the following Equation 35.

$$w_{OBF,k} = \underset{\|w\|=1}{\operatorname{argmax}} w^H \overline{R}_{D,k} w \quad \text{(Equation 35)}$$

The OBF weight vector for the terminal k may be represented by the following Equation 36.

$$w_{OBF,k} = \frac{h_k^*}{\|h_k\|} \quad \text{(Equation 36)}$$

While the OBF maximizes the instantaneous reception SNR of terminal, the EBF can maximize the mean reception SNR. The mean reception SNR for the terminal k may be represented by the following Equation 37.

$$E[\gamma_k] = w^H E[h_k^* h_k^T] w = w^H R_{D,k} w \quad \text{(Equation 37)}$$

In the above Equation 37, $R_{D,k} = E[h_k^* h_k^T]$, and the $R_{D,k}$ may be defined as a downlink spatial covariance matrix for the terminal k. The downlink spatial covariance matrix may be decomposed (that is, through eigen-decomposition), as shown in the following Equation 38.

$$R_{D,k} = E_{D,k} \Lambda_{D,k} E_{D,k}^H \quad \text{(Equation 38)}$$

In the above Equation 38, $E_{D,k}$ and $\Lambda_{D,k}$ may be represented by the following Equation 39.

$$E_{D,k} = [e_{(D,k),1} \ldots e_{(D,k),M}]$$

$$\Lambda_{D,k}(n) = \operatorname{daig}(\lambda_{(D,k),1}, \ldots, \lambda_{(D,k),M}) \quad \text{(Equation 39)}$$

In the above Equation 39, $e_{(D,k),1}$ represents a maximum eigenvector, and $\lambda_{(D,k),1}$ represents a maximum eigenvalue corresponding to the maximum eigenvector.

Meanwhile, a weight vector of the EBF can maximize the mean reception SNR, as shown in Equation 40.

$$w_{EBF,k} = \underset{\|w\|^2=1}{\operatorname{argmax}} E[\gamma_k] = \underset{\|w\|^2=1}{\operatorname{argmax}} w^H R_{D,k} w \quad \text{(Equation 40)}$$

In the above Equation 40, the weight vector of the EBF for the terminal k is the maximum eigenvector of $R_{D,k}$.

That is, the weight vector of the EBF may be represented by the following Equation 41.

$$w_{EBF,k} = e_{(D,k),1} \quad \text{(Equation 41)}$$

Because the downlink spatial covariance matrix is required to calculate the weight vector of the EBF, the BS cannot calculate the $w_{EBF,k}$ directly. Therefore, the feedback information may have to be provided to the BS through the uplink in order for the BS to perform transmission beamforming according to the EBF scheme. However, according to the BBF, the BS may perform the transmission beamforming using the reciprocal of the spatial covariance matrix of the up/down link without the feedback information of the terminal.

The uplink spatial covariance matrix for the terminal k may be defined as shown in the following Equation 42.

$$R_{U,k} = E[g_k^* g_k^T] \quad \text{(Equation 42)}$$

In the above Equation 42, $g_k$ represents an uplink vector between a terminal k and a BS antenna. When the reciprocity of the spatial covariance matrix of the up/down link is ensured, the relationship may be established as shown in the following Equation 43.

$$R_{U,k} = R_{D,k} \quad \text{(Equation 43)}$$

That is, the uplink spatial covariance matrix can be replaced by the downlink spatial covariance matrix in the FDD system. Therefore, the maximum eigenvector of the spatial covariance matrix of the up/down link may be identical as in the following Equation 44.

$$e_{(D,k),1} = e_{(U,k),1} \quad \text{(Equation 44)}$$

In the above Equation 44, $e_{(U,k),1}$ represents the maximum eigenvector of the uplink spatial covariance matrix $R_{U,k}$. The weight vector of the BBF scheme for the terminal k may be obtained based on the uplink spatial covariance matrix and the following Equation 45.

$$w_{BBF,k} = e_{(U,k),1} \quad \text{(Equation 45)}$$

Meanwhile, as the frequency of the used band is higher, the scattering is reduced and the channel environment may gradually become the LOS channel. In this case, the weight vector of the BBF may approximate the weight vector of the OBF as shown in Equation 46.

$$w_{BBF,k} \approx w_{OBF,k} \quad \text{(Equation 46)}$$

Figure 11:
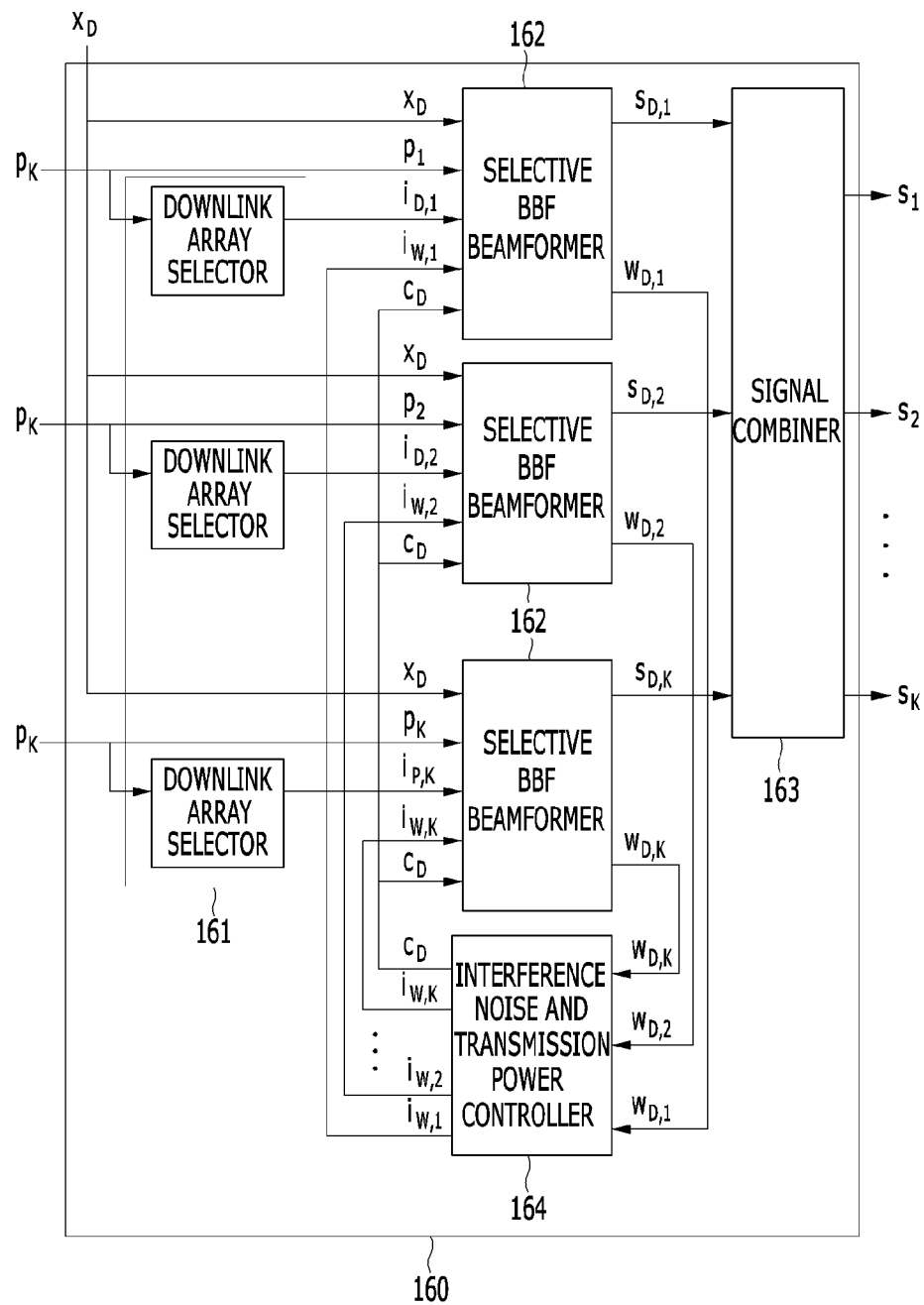
FIG. 11 is a schematic structural diagram illustrating a transmission beamformer of a BS according to an exemplary embodiment.
Figure 12:
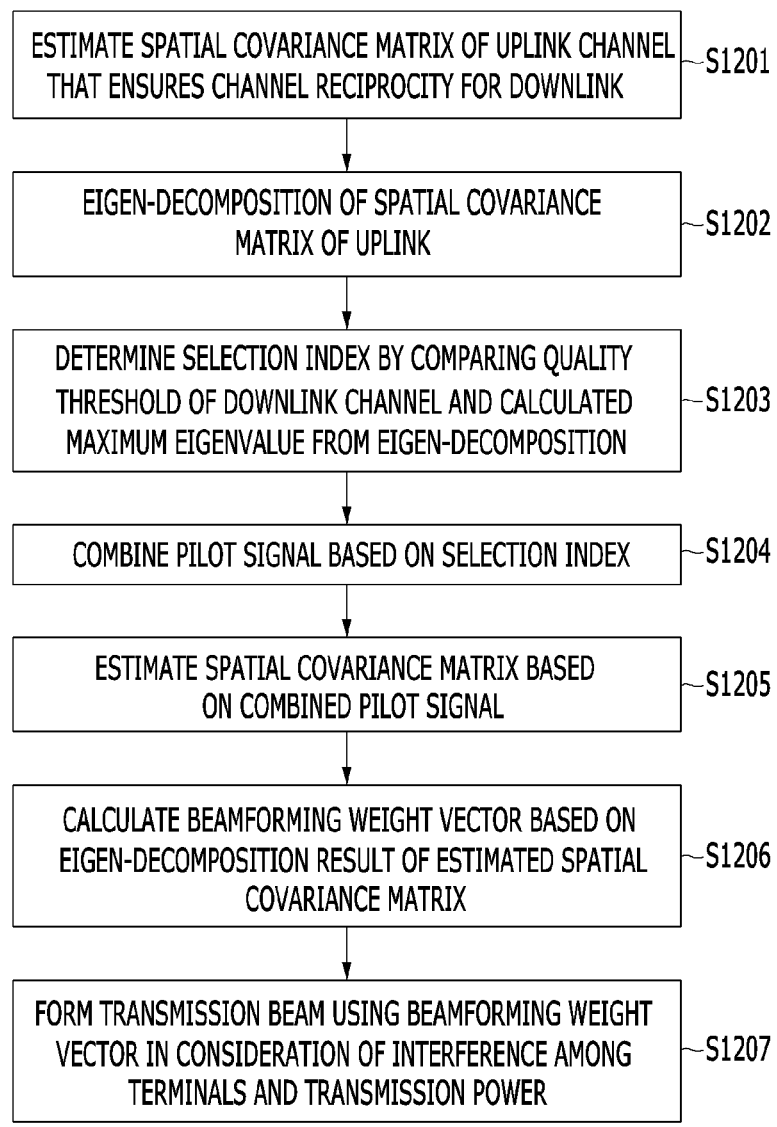
FIG. 12 is a flowchart illustrating a method for transmitting a signal of a BS processor according to an exemplary embodiment.

FIG. 11 is a schematic structural diagram illustrating a transmission beamformer of the BS according to an exemplary embodiment, and FIG. 12 is a flowchart illustrating a method for transmitting a signal of the BS processor according to an exemplary embodiment.

According to an exemplary embodiment, the transmission beamformer 160 performs independent transmission beamforming for each terminal. Referring to FIG. 11, the transmission beamformer 160 includes at least one downlink array selector 161, at least one selective BBF beamformer 162, a signal combiner 163, and an interference noise and transmission power controller 164.

In the following, the selective BBF beamforming method in the transmission beamformer 160 is described using FIG. 11 and FIG. 12.

When the downlink between the terminal and array is poor, the transmission beam may interfere with the other terminal and detract from performance of the other terminal because a probability of transmission success is low and estimation performance for a spatial correlation matrix is also low. Therefore, the array having a poor downlink channel in the transmission beamforming for transmission of a data signal is eliminated. In addition, the calculation load of the eigen-decomposition that is required for calculating the weight vector of the BBF may exponentially increase as the number of transmission antennas increases. Therefore, the selective BBF scheme that selects a LOS-dominant or LOS channel which has good quality may raise the transmission efficiency and may lower the system complexity. Meanwhile, the UE-centric virtual cell may be formed in the downlink through the selective BBF.

In order to perform the selective BBF beamforming, the array used for the beamforming may be selected for each terminal. The BS in the FDD system cannot directly estimate the quality of the downlink channel without the feedback information. However, when the reciprocity of the spatial covariance matrix of the up/down link is ensured, the BS can indirectly estimate the channel quality of the downlink and determine whether the BS select arrays not using the spatial covariance matrix of the uplink.

First of all, the spatial covariance matrix of the up/down link between a terminal k and an array a may be defined as shown in the following Equation 47.

$$R_{U,a,k}=E[g^*_{a,k}g_{a,k}^T], R_{D,a,k}=[h^*_{a,k}h_{a,k}^T] \quad \text{(Equation 47)}$$

When the reciprocity of the spatial covariance matrix of the up/down link is ensured, the spatial covariance matrix of the up/down link between the terminal k and the array a may be considered identical as shown in Equation 48.

$$R_{U,a,k}=R_{D,a,k} \quad \text{(Equation 48)}$$

In BBF transmission beamforming, a maximum eigenvector $e_{(U,a,k),1}$ of $R_{U,a,k}$ may represent a direction of the BBF transmission beam, and a maximum eigenvalue $\lambda_{(U,a,k),1}$ corresponding to the maximum eigenvector may represent a mean quality of the channel formed by the transmission beam.

Meanwhile, the ensemble average may be used so that the BS estimates the spatial covariance matrix. Alternatively, the ensemble average may be replaced with a time average when the real system is implemented.

The spatial covariance matrix of the uplink channel in frame f (the length $n=fL_F+LU$) may be estimated as shown in Equation 49 (S1201).

$$\hat{R}_{U,a,k}(n) = \frac{1}{L_U|p_{U,k}|^2}\sum_{i=f}^{f-F_C+1}\sum_{l=1}^{L_U} p_{a,k}(l+iL_F)p_{a,k}^H(l+iL_F) \quad \text{(Equation 49)}$$

In the above Equation 49, $F_C$ represents a frame number for the estimation of the spatial covariance matrix. The eigen-decomposition of the spatial covariance matrix of the uplink may be performed based on the estimated uplink spatial covariance matrix $\hat{R}_{U,a,k}$ as shown in Equation 50 (S1202).

$$\hat{R}_{U,a,k}=\hat{E}_{U,a,k}\hat{\Lambda}_{U,a,k}\hat{E}_{U,a,k}^H \quad \text{(Equation 50)}$$

In the above Equation 50, $\hat{E}_{U,a,k}$ and $\Lambda_{U,k}$ may be represented by the following Equation 51.

$$\hat{E}_{U,a,k}=[\hat{e}_{(U,a,k),1}\ldots \hat{e}_{(U,a,k),M}]$$

$$\Lambda_{U,k}=\text{daig}(\hat{\lambda}_{(U,a,k),1},\ldots,\hat{\lambda}_{(U,a,k),M}) \quad \text{(Equation 51)}$$

In the above Equation 51, $\hat{e}_{(U,a,k),1}$ represents a maximum eigenvector, and $\hat{\lambda}_{(U,a,k),1}$ represents a maximum eigenvalue.

Thereafter, an array selection index for a downlink between the array a and the terminal k may be determined as shown in Equation 52.

$$i_{D,a,k} = \begin{cases} 1, & \hat{\lambda}_{(U,a,k),1} > T_D \\ 0, & \hat{\lambda}_{(U,a,k),1} \leq T_D \end{cases} \quad \text{(Equation 52)}$$

In the above Equation 52, TD represents the quality threshold value of the downlink channel. Finally, the downlink array selector 161 may output the array selection index vector for the downlink array as shown in Equation 53 (S1203).

$$I_D=[i_{D,1}i_{D,2}\ldots i_{D,K}] \quad \text{(Equation 53)}$$

In the above Equation 53, $i_{D,k}=[i_{D,1,k}\ i_{D,2,k}\ldots i_{D,A,k}]^T$, and the $i_{D,k}$ represents the array selection index vector for the terminal k. In this case, the selected array for each terminal may be different because the up/down link channels are different and the selection method is different. That is, the shape of the UE-centric virtual cell formed at uplink may be different.

Then, selective BBF beamforming may be performed for each terminal based on the array selection index vector.

Figure 13:
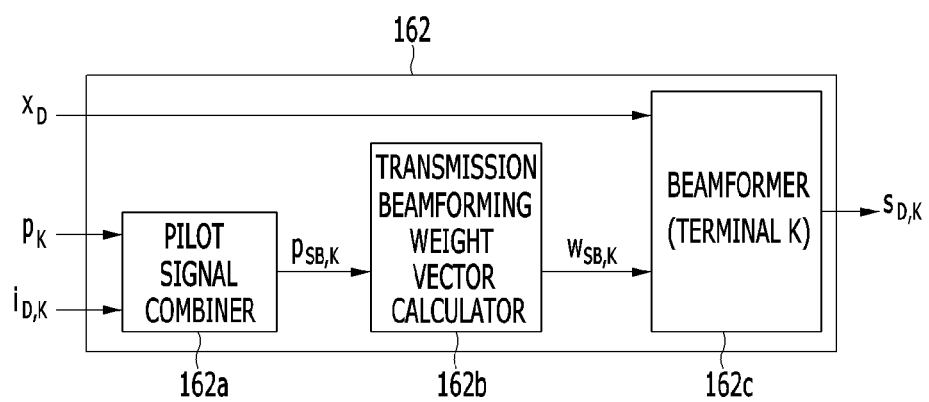
FIG. 13 is a schematic structural diagram illustrating a selective BBF beamformer of a BS according to an exemplary embodiment.

FIG. 13 is a schematic structural diagram illustrating a selective BBF beamformer of BS according to an exemplary embodiment.

Referring to FIG. 13, the selective BBF beamformer 162 includes a pilot signal combiner 162a, a transmission beamforming weight vector calculator 162b, and a beamformer 162c.

The pilot signal combiner 162a combines signal vectors of the pilot signal to perform a selective BBF based on the array selection index for the downlink array. When the $\bar{A}_k$ arrays of the A arrays are selected to provide services to a terminal k, the combined pilot signal vector between the terminal k and BS antennas may be represented by the following Equation 54.

$$p_{SB,k} = \begin{bmatrix} p_{(1),k} \\ p_{(2),k} \\ \vdots \\ p_{(\bar{A}_k),k} \end{bmatrix} \quad \text{(Equation 54)}$$

In the above Equation 54, $p_{(a),k}$ represents the pilot signal vector between the selected a-th array and the terminal k. Further, the number of BS antennas included in the selected a-th array is $M_{(a)}$.

For example, when the BS processor is connected to 5 arrays and the $1^{st}$, $3^{rd}$, and $4^{th}$ arrays are selected for the terminal k, the array selection index vector for the downlink arrays may be represented by the following Equation 55.

$$i_{D,k}=[i_{D,1,k}i_{D,2,k}i_{D,3,k}i_{D,4,k}i_{D,5,k}]^T=[10110]^T \quad \text{(Equation 55)}$$

In this case, the combined pilot signal vector for the terminal k may be represented by the following Equation 56 (S1204).

$$p_{SB,k} = \begin{bmatrix} p_{(1),k} \\ p_{(2),k} \\ p_{(3),k} \end{bmatrix} = \begin{bmatrix} p_{1,k} \\ p_{3,k} \\ p_{4,k} \end{bmatrix} \quad \text{(Equation 56)}$$

In an exemplary embodiment, the selective BBF may be operated as a full BBF or a partial BBF. When the selective BBF is operated as the full BBF, all arrays are included for the transmission beamforming and the pilot signal vector between the terminal k and the BS antennas may be represented by the following Equation 57.

$$p_{(a),k}=p_{a,k}, a=1,\ldots,A \quad \text{(Equation 57)}$$

In this case, the spatial covariance matrix of the uplink channel for the selective BBF at a frame f (the length of the frame $n=fL_F+L_U$) may be estimated as shown in Equation 58 (S1205).

$$\hat{R}_{SB,k}(n) = \frac{1}{L_U |p_{U,k}|^2} \sum_{i=f}^{f-F_C+1} \sum_{l=1}^{L_U} p_{SB,k}(l + iL_F) p_{SB,k}^H(l + iL_F)$$ (Equation 58)

The estimated spatial covariance matrix may decomposed (that is, through eigen-decomposition) as shown in Equation 59.

$$\hat{R}_{SB,k} = \hat{E}_{SB,k} \hat{\Lambda}_{SB,k} \hat{E}_{SB,k}^H$$ (Equation 59)

In the above Equation 59, $\hat{E}_{SB,k}$ and $\hat{\Lambda}_{SB,k}$ may be represented by the following Equation 60.

$$\hat{E}_{SB,k} = [\hat{e}_{(SB,k),1} \ldots \hat{e}_{SB,k,M}]$$

$$\hat{\Lambda}_{SB,k} = \mathrm{daig}(\hat{\lambda}_{(SB,k),1}, \ldots, \hat{\lambda}_{(SB,k),M})$$ (Equation 60)

In the above Equation 60, $\hat{e}_{(SB,k),1}$ represents a maximum eigenvector, and $\hat{\lambda}_{(SB,k),1}$ represents a maximum eigenvalue.

In the foregoing OBF, EBF, and BBF, it is hypothesized that one terminal exists in a network and the power of the transmission beam is limited to 1($\|w\|=1$). When a plurality of terminals exist in the network, the larger transmission power may be allocated to a terminal having good channel quality. In this case, the selective BBF weight vector for the terminal k may be represented by the following Equation 61 (S1206).

$$w_{SB,k} = \hat{\lambda}_{(SB,k),1} \hat{e}_{(SB,k),1}$$ (Equation 61)

The selective BBF weight vector for the terminal k may include weight vectors for each $\bar{A}_k$ array.

$$w_{SB,k} = \begin{bmatrix} w_{SB,(1),k} \\ w_{SB,(2),k} \\ \vdots \\ w_{SB,(\bar{A}_k),k} \end{bmatrix}$$ (Equation 62)

In the above Equation 62, $w_{SB(a),k}$ represents the selective BBF weight vector of the selected a-th array for the terminal k.

The transmission beamforming weight vector calculator 162b of the selective BBF beamformer 162 may calculate a transmission beamforming weight vector for all arrays (A) by combining $\bar{A}_k$ selective BBF weight vectors. The transmission beamforming weight vector may be represented by the following Equation 63.

$$w_{D,k} = \begin{bmatrix} w_{D,1,k} \\ w_{D,2,k} \\ \vdots \\ w_{D,A,k} \end{bmatrix}$$ (Equation 63)

In the above Equation 63, $w_{D,a,k}$ is a transmission beamforming weight vector for an array a. When the array a is not a selected array, $w_{D,a,k}$ becomes 0. For example, when the BS of A=5 selects $1^{st}$, $3^{rd}$, and $4^{th}$ arrays for the terminal k (that is, $\bar{A}_k=3$), the transmission beamforming weight may be represented by the following Equation 64.

$$w_{D,k} = \begin{bmatrix} w_{D,1,k} \\ w_{D,2,k} \\ w_{D,3,k} \\ w_{D,4,k} \\ w_{D,5,k} \end{bmatrix} = \begin{bmatrix} w_{SB,(1),k} \\ 0_{M_2} \\ w_{SB,(2),k} \\ w_{SB,(3),k} \\ 0_{M_5} \end{bmatrix}$$ (Equation 64)

Meanwhile, when a new terminal approaches the exist terminal and the number of BS antennas is finite, interference between users may occur. In this case, the interference noise and transmission power controller 164 of the transmission beamformer 160 may determine the interference from the new terminal to the exist terminal using an estimated transmission beamforming weight vector of the new terminal and determine whether a service is allowable. In this case, the interference noise and transmission power controller 164 may manage a service condition vector. The service condition vector may be represented by the following Equation 65.

$$i_S = [i_{S,1} i_{S,2} \ldots i_{S,K}]^T$$ (Equation 65)

In the above Equation 65, $i_{s,k}$ represents a service condition index for the terminal k. The service condition index is set as 1 when the services are being served ($i_{S,K}=1$), and the service condition index is set as 0 when the service is not being served ($i_{S,K}=0$).

The total interference of the transmission beams transmitted from the terminal k and the existing terminal may be represented by the following Equation 66.

$$P_{w,k} = \sum_{j=1, j\neq k}^{K} i_{S,j} w_{D,j}^H w_{D,k}$$ (Equation 66)

Further, the service condition index for the terminal k may be determined as shown in Equation 67.

$$i_{S,k} = \begin{cases} 1, & P_{w,k} < (K_s - 1)T_w \\ 0, & P_{w,k} > (K_s - 1)T_w \end{cases}$$ (Equation 67)

In this case, $T_w$ represents a critical value of interference for a terminal. The number of terminals being served may be represented by the following Equation 68.

$$K_s = \sum_{k=1}^{K} i_{S,k}$$ (Equation 68)

That is, the selective BBF beamformer 162 in the exemplary embodiment may form a transmission beam in consideration of the interference between terminals being serviced.

Further, the interference noise and transmission power controller 164 may determine a transmission power coefficient $C_D$ as shown in the following Equation 69.

$$C_D = \frac{1}{\sum_{k=1}^{K} i_{S,k} |\hat{\lambda}_{(SB,k),1}|^2}$$ (Equation 69)

Therefore, the transmission beamformed signal where the transmission power coefficient has been considered and that is to be transmitted to the terminal k through the array a may be represented by the following Equation 70.

$$s_{a,k} = C_D w_{D,a,k} x_{D,k} \quad \text{(Equation 70)}$$

Thereafter, the selective BBF beamformer 164 outputs a M×1 transmission beamformed signal vector for the terminal k as shown in Equation 71.

$$s_{D,k} = \begin{bmatrix} s_{1,k} \\ s_{2,k} \\ \vdots \\ s_{A,k} \end{bmatrix} \quad \text{(Equation 71)}$$

In the above Equation 71, when $i_{S,k}=0$, $s_{D,k}=0_{M \times 1}$.

The signal combiner 163 of the transmission beamformer 160 according to the exemplary embodiment outputs transmission signals for each array by combining transmission beamforming signals to be transmitted to all terminals of each array (S1207). That is, the transmission signal to be transmitted through an array a may be represented by the following Equation 72.

$$s_a = \sum_{k=1}^{K} s_{a,k} \quad \text{(Equation 72)}$$

Finally, the outputted signal of the transmission beamformer 160 may be represented by the following Equation 73.

$$s = \begin{bmatrix} s_1 \\ s_2 \\ \vdots \\ s_A \end{bmatrix} \quad \text{(Equation 73)}$$

In the above Equation 73, s represents a digital array transmission signal.

Referring to FIG. 4, the D/A converter 170 converts the digital array transmission signal s to a baseband analog array transmission signal, and the RF chain 180 converts the baseband analog array transmission signal to an RF analog array transmission signal $\bar{s}$. The RF analog array transmission signal $\bar{s}$ may be represented by the following Equation 74.

$$\bar{s} = \begin{bmatrix} \bar{s}_1 \\ \bar{s}_2 \\ \vdots \\ \bar{s}_A \end{bmatrix} \quad \text{(Equation 74)}$$

In the above Equation 74, $\bar{s}_a$ represents the RF analog array transmission signal to be transmitted through an array a. Thereafter, the link 250 delivers the RF analog array transmission signal to the distributed array 200. Further, the distributed array 200 transmits the delivered RF analog array transmission signal to K terminals through M BS antennas included in the A arrays.

Figure 14:
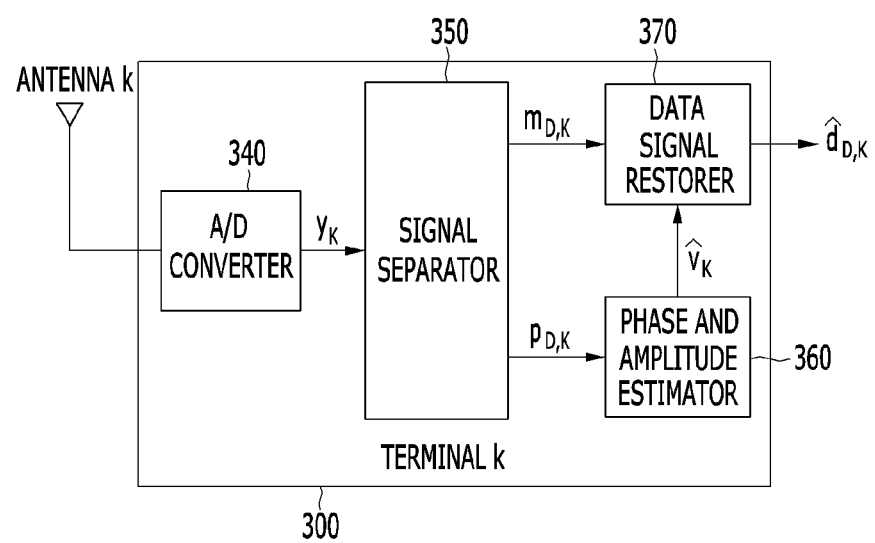
FIG. 14 is a schematic structural diagram illustrating a reception terminal of the DAMMS according to an exemplary embodiment.

FIG. 14 is a schematic structural diagram illustrating a reception terminal of the DAMMS according to an exemplary embodiment.

Referring to FIG. 14, a reception terminal 300 according to an exemplary embodiment includes an A/D converter 340, a signal separator 350, a phase and amplitude estimator 360, and a data signal restorer 370.

The A/D converter 340 converts an analog signal received by an antenna k to a digital signal. The received digital signal of a terminal k may be represented by the following Equation 75.

$$y_k = h_k^T s + n_{D,k} = h_k^T \sum_{k=1}^{K} s_{D,k} + n_{D,k} \quad \text{(Equation 75)}$$

In the above Equation 75, $h_k$ represents a downlink channel vector between the terminal k and a BS, $n_{D,k}$ represents an AWGN of the downlink, and the variance of the AWGN is represented $\text{var}(n_{D,k}) = \sigma_{n,D}^2$.

The signal separator 350 separates a data signal $m_{D,k}$ and a pilot signal $p_{D,k}$ from the received digital signal. The data signal $m_{D,k}$ may be represented by the following Equation 76.

$$m_{D,k} = C_D h_k^T \sum_{k=1}^{K} w_{D,k} d_{D,k} + n_{D,k} \quad \text{(Equation 76)}$$

$$= C_D h_k^T w_{D,k} d_{D,k} + C_D \sum_{j=1, j \neq k}^{K} h_k^T w_{D,j} d_{D,j} + n_{D,k}$$

$$= \beta_k e^{j\theta_k} d_{D,k} + i_{D,k} + n_{D,k}$$

In the above Equation 76, $\beta_k = |C_D h_k^T w_{D,k}|$ represents the amplitude of the received signal, $\theta_k = \angle(C_D h_k^T w_{D,k})$ represents the phase of the received signal, and $i_{D,k} = C_D \sum_{j=1, j \neq k}^{K} h_k^T w_{D,j} d_{D,j}$ represents the interference noise of the received signal among users. Further, the interference noise of the transmission beam among users may be represented by the following Equation 77.

$$i_{W,k} = C_D \sum_{j=1, j \neq k}^{K} w_{D,k}^H w_{D,j} d_{D,j} \quad \text{(Equation 77)}$$

The interference noise of the transmission beam among users of the downlink may be limited by the interference noise check function of the BS. However, the magnitude of the interference noise of the received signal among users may not be limited by the limitation of the interference signal noise of the transmission beam.

As in the foregoing embodiment, if the scattering is lower and the channel approaches the LOS channel, the BBF weight vector may be approximated by the OBF weight vector. In this case, the weight vector of the transmission selective BBF beamforming may be represented by the following Equation 78.

$$w_{D,k} \approx \|h_k\|^2 w_{OBF,k} = h_k^* \quad \text{(Equation 78)}$$

If the number of the BS antennas is increased, the interference noise of the received signal and the transmission beam may approach '0'. That is, when the frequency band is high and many BS antennas are used, the performance of the BBF transmission beamforming can be enhanced.

When the amplitude and the phase of the received signal of the terminal k is $\theta_k=\beta_k e^{j\Theta_k}$, the data signal $m_{D,k}$ may be represented by the following Equation 79.

$$m_{D,k}=\theta_k d_{D,k}+i_{D,k}+n_{D,k} \quad \text{(Equation 79)}$$

In the above Equation 79, in order to restore the transmitted data signal from the BS for the terminal k, the amplitude and the phase of the received signal ($\theta_k=\beta_k e^{j\Theta_k}$) may have to be estimated. In this case, a common pilot symbol of the downlink may be used. The received pilot signal separated by the signal separator 350 may be represented by the following Equation 80.

$$p_{D,k}=\theta_k p_D+i_{P,k}+n_{D,k} \quad \text{(Equation 80)}$$

In the above Equation 80, $i_{P,k}=C_D\Sigma_{j=1,j\neq k}^{K}h_k^T w_{D,j} P_D$ represents interference noise among users of the pilot signal.

Further, the phase and amplitude estimator 360 may perform the estimation of the phase and the amplitude in the frame f (the length n of the frame $f=fL_F+L_D$) as shown in the following Equation 81.

$$\hat{\theta}_k(n) = \quad \text{(Equation 81)}$$

$$\frac{1}{L_D|p_D|^2}\sum_{l=1}^{L_D} p_D^*(l+fL_F)p_D(l+fL_F) = \beta_k(n)e^{j\theta_k(n)} + e'_{P,k}$$

The data signal restorer 370 restores a transmission data signal from the BS by compensating the estimated phase and amplitude for the data signal as shown in the following Equation 82.

$$\hat{d}_{D,k} = \hat{\theta}_k^{-1} y_{D,k} = \hat{\theta}_k^{-1} \theta_k d_{D,k} + \hat{\theta}_k^{-1} i_{P,k} + \hat{\theta}_k^{-1} n_{D,k} \quad \text{(Equation 82)}$$

In this case, the more accurate the phase and the amplitude are estimated, the higher accuracy of the restored data signal is. When the estimation of the amplitude and the phase is performed ideally, ($\hat{\theta}_k=\theta_k$), the restored transmission data signal may be represented by the following Equation 83.

$$\hat{d}_{D,k}=d_{D,k}+\theta_k^{-1}i_{P,k}+\theta_k^{-1}n_{D,k} \quad \text{(Equation 83)}$$

That is, the better channel enlarges the amplitude and reduces the influence of the interference and the noise. Finally, the restored data signal will be demodulated and decoded.

A high-quality and high-speed mobile communication service may be provided at a low cost without the coverage hole and shaded area in the FDD system.

Figure 15:
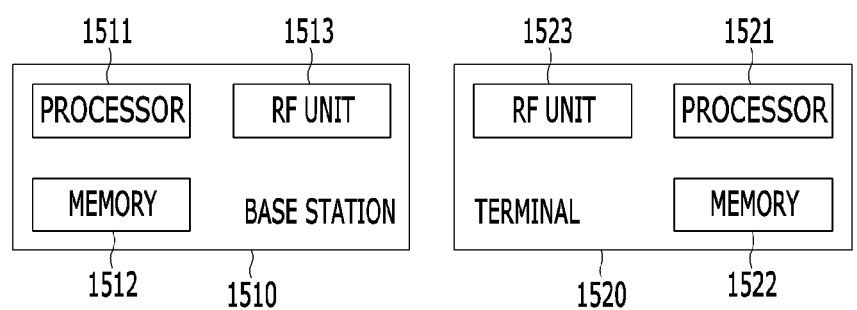
FIG. 15 is a block diagram illustrating a wireless communication system according to an exemplary embodiment.

FIG. 15 is a block diagram illustrating a wireless communication system according to an exemplary embodiment of the present invention.

Referring to FIG. 15, a wireless communication system according to an exemplary embodiment includes a base station 1510 and a terminal 1520.

The base station 1510 includes a processor 1511, a memory 1512, and a radio frequency (RF) unit 1513. The memory 1512 is connected to the processor 1511 to store various information for driving the processor 1511 or at least one program executed by the processor 1511. The wireless frequency unit 1513 may be connected to the processor 1511 to transmit/receive a wireless signal. The processor 1511 may implement functions, processes, or methods proposed by the exemplary embodiment of the present disclosure. In this case, in the wireless communication system according to the exemplary embodiment of the present invention, a wireless interface protocol layer may be implemented by the processor 1511. An operation of the base station 1510 according to the exemplary embodiment may be implemented by the processor 1511.

The terminal 1520 includes a processor 1521, a memory 1522, and a radio frequency unit 1523. The memory 1522 may be connected to the processor 1521 to store various information for driving the processor 1521. The radio frequency unit 1523 may be connected to the processor 1521 to transmit/receive a wireless signal. The processor 1521 may implement functions, processes, or methods proposed by the exemplary embodiment of the present disclosure. In this case, in the wireless communication system according to the exemplary embodiment of the present invention, a wireless interface protocol layer may be implemented by the processor 1521. An operation of the terminal 1520 according to the exemplary embodiment may be implemented by the processor 1521.

According to the exemplary embodiment of the present invention, the memory may be positioned inside or outside the processor, and the memory may be connected to a processor through already-known various means. The memory may be various types of volatile or non-volatile storage media. For example, the memory may include a read-only memory (ROM) or a random access memory (RAM).

Although the exemplary embodiments are described in detail, the scope is not limited thereto, but various variations or alterations by those skilled in the art using a basic concept defined in the following claims are considered to be included in the scope of the present invention.

What is claimed is:

1. An apparatus for transmitting signals, the apparatus comprising:
    at least one processor;
    a memory; and
    a radio frequency unit,
    by executing at least one program stored in the memory,
    wherein the at least one processor selects at least one array of a plurality of arrays connected to the apparatus based on a spatial covariance matrix of an uplink from a terminal to the plurality of arrays,
    wherein the spatial covariance matrix ensures channel reciprocity at downlink from the plurality of arrays to the terminal, and forms a transmission beam to be transmitted to the terminal through the at least one selected array,
    wherein the plurality of arrays include at least one base station (BS) antenna, respectively, and
    wherein when selecting the at least one array, the at least one processor estimates the spatial covariance matrix based on a pilot signal to be transmitted to the terminal; determines a selection index to select the at least one array based on the estimated spatial covariance matrix; and selects the at least one array based on the selection index.

2. The apparatus of claim 1, wherein when determining the selection index, the at least one processor performs eigen-decomposition on the spatial covariance matrix, and determines the selection index to compare a result of the eigen-decomposition with a quality threshold value of channel at the downlink.

3. The apparatus of claim 1, wherein when forming the transmission beam, the at least one processor forms the transmission beam based on a Blind Beam-Forming (BBF) scheme.

4. The apparatus of claim 3, wherein when forming the transmission beam based on the BBF scheme, the at least one processor performs eigen-decomposition on the spatial covariance matrix, calculates a weight vector based on a result of the eigen-decomposition, and forms the transmission beam using the weight vector based on the BBF scheme.

5. The apparatus of claim 4, wherein when calculating the weight vector, the at least one processor calculates the weight vector based on a maximum eigenvector and a maximum eigenvalue of the spatial covariance matrix, which is the result of the eigen-decomposition.

6. The apparatus of claim 4, wherein when forming the transmission beam using the weight vector based on the BBF scheme, the at least one processor forms the transmission beam in consideration of a transmission power coefficient and interference with other terminals.

7. The apparatus of claim 1, wherein the at least one processor further converts the transmission beam into a radio frequency (RF) analog signal, and delivers the RF analog signal to the at least one selected array through a link.

8. A method for transmitting signals, comprising:
selecting at least one array of a plurality of arrays connected to a signal transmitting apparatus based on a spatial covariance matrix of an uplink from a terminal to the plurality of arrays, wherein the spatial covariance matrix ensures channel reciprocity at downlink from the plurality of arrays to the terminal; and
forming a transmission beam to be transmitted to the terminal through the at least one selected array,
wherein the plurality of arrays include at least one base station (BS) antenna, respectively, and
wherein the selecting comprises:
estimating the spatial covariance matrix based on a pilot signal to be transmitted to the terminal;
determining a selection index to select the at least one array based on the estimated spatial covariance matrix; and
selecting the at least one array based on the selection index.

9. The method of claim 8, wherein the determining the selection index comprises:
performing eigen-decomposition on the spatial covariance matrix; and
determining the selection index to compare a result of the eigen-decomposition with a quality threshold value of a channel at the downlink.

10. The method of claim 8, wherein the forming the transmission beam comprises forming the transmission beam based on a Blind Beam-Forming (BBF) scheme.

11. The method of claim 10, wherein the forming the transmission beam based on the BBF scheme comprises:
performing eigen-decomposition on the spatial covariance matrix;
calculating a weight vector based on a result of the eigen-decomposition; and
forming the transmission beam using the weight vector based on the BBF scheme.

12. The method of claim 11, wherein the calculating the weight vector comprises calculating the weight vector based on a maximum eigenvector and a maximum eigenvalue of the spatial covariance matrix, which is the result of the eigen-decomposition.

13. The method of claim 11, wherein the forming the transmission beam using the weight vector based on the BBF scheme comprises forming the transmission beam in consideration of a transmission power coefficient and interference with other terminals.

14. The method of claim 8, further comprising: converting the transmission beam into radio frequency (RF) analog signals; and delivering the RF analog signals to the at least one selected array through a link.

15. An apparatus for receiving signals, the apparatus comprising:
at least one processor;
a memory; and
a radio frequency unit,
by executing at least one program stored in the memory,
wherein the at least one processor selects at least one array of a plurality of arrays connected to the apparatus based on an estimated channel vector on a channel of an uplink from a terminal to the plurality of arrays, and forms a reception beam based on a received data signal through the at least one selected array,
wherein the plurality of arrays include at least one base station (BS) antenna, respectively, and
wherein when selecting the at least one array, the at least one processor determines a selection index by comparing the estimated channel vector with a quality threshold value on the channel of the uplink, and selects the at least one array based on the selection index.

16. The apparatus of claim 15, wherein when forming the reception beam, the at least one processor forms the reception beam based on a maximal ratio combining (MRC) scheme.

17. The apparatus of claim 16, wherein when forming the reception beam based on the MRC scheme, the at least one processor forms the reception beam using a reception power coefficient and a beamforming weight vector based on the MRC scheme.

* * * * *